US008331073B2

(12) United States Patent
Chang

(10) Patent No.: US 8,331,073 B2
(45) Date of Patent: Dec. 11, 2012

(54) ELECTROMAGNETIC PULSE PROTECTION CIRCUIT HAVING WAVE FILTERING CAPABILITY

(75) Inventor: Liann-Be Chang, Tao-Yuan (TW)

(73) Assignee: Chang Gung University, Tao-Yuan (TW)

( * ) Notice: Subject to any disclaimer, the term of this patent is extended or adjusted under 35 U.S.C. 154(b) by 411 days.

(21) Appl. No.: 12/407,899

(22) Filed: Mar. 20, 2009

(65) Prior Publication Data

US 2009/0310273 A1 Dec. 17, 2009

(30) Foreign Application Priority Data

Mar. 21, 2008 (TW) .............................. 97110125 A

(51) Int. Cl.
H02H 3/22 (2006.01)
(52) U.S. Cl. ........................................ 361/111; 361/119
(58) Field of Classification Search .................. None
See application file for complete search history.

(56) References Cited

U.S. PATENT DOCUMENTS

| | | | | |
|---|---|---|---|---|
| 4,563,720 A * | 1/1986 | Clark | ............................... | 361/56 |
| 4,628,394 A * | 12/1986 | Crosby et al. | ................... | 361/56 |
| 4,675,772 A * | 6/1987 | Epstein | ............................. | 361/56 |
| 4,677,518 A * | 6/1987 | Hershfield | ....................... | 361/56 |
| 4,760,485 A * | 7/1988 | Ari et al. | .......................... | 361/54 |
| 4,845,580 A * | 7/1989 | Kitchens | ........................ | 361/113 |
| 4,890,180 A * | 12/1989 | Paulsson | ......................... | 361/16 |
| 4,901,183 A * | 2/1990 | Lee | ................................ | 361/56 |
| 4,985,800 A * | 1/1991 | Feldman et al. | ............... | 361/113 |
| 5,136,455 A * | 8/1992 | Billingsley | ....................... | 361/56 |
| 5,173,835 A * | 12/1992 | Cornett et al. | ................. | 257/310 |
| 5,278,529 A * | 1/1994 | Willems | ......................... | 333/204 |
| 5,280,638 A * | 1/1994 | Porambo et al. | .............. | 455/143 |
| 5,572,116 A * | 11/1996 | Kurasawa et al. | .......... | 324/103 P |
| 5,966,283 A * | 10/1999 | Glaser et al. | ................... | 361/119 |
| 6,053,769 A * | 4/2000 | Kubota et al. | ................. | 439/578 |
| 6,829,129 B2 * | 12/2004 | Marsh et al. | ................... | 361/111 |
| 6,944,435 B2 * | 9/2005 | Contopanagos et al. | ...... | 455/307 |
| 2005/0179113 A1* | 8/2005 | Kim et al. | ...................... | 257/595 |

OTHER PUBLICATIONS

MIL-STD-188-125-1, High-Altitude Electromagnetic Pulse (HEMP) Protection for Ground-Based C41 Facilities Performing Critical, Time-Urgent Missions, Department of Defense, Jul. 17, 1998.
MIL-STD-188-125-2, High-Altitude Electromagnetic Pulse (HEMP) Protection for Ground-Based C41 Facilities Performing Critical, Time-Urgent Missions, Department of Defense, Mar. 3, 1999.
Ji-Chyun Liu et al, Wide-Band Double-Ring Resonator with Transmission Zeros and Resonances Using high permittivity Aluminium Nitride Substrtate, Microwave and Optical Technology Letters, vol. 51, No. 12, Dec. 12, 2009.

* cited by examiner

*Primary Examiner* — Jared Fureman
*Assistant Examiner* — Terrence Willoughby
(74) *Attorney, Agent, or Firm* — Ming Chow; Sinorica, LLC

(57) ABSTRACT

An electromagnetic pulse protection circuit having wave filtering functions, composed of an inductor free slow response protection circuit and a fast response protection circuit, and a filter is series-connected on a signal transmission route, and is utilized to provide impedance in effectively preventing electromagnetic pulses caused by lightning (LS) or other electronic weapon (NEMP, HEMP, PEMP) interferences. In addition, it is capable of suppressing electromagnetic pulses at specific frequencies, thus, raising the capability of electronic elements in resisting against electromagnetic pulses. Furthermore, said filter is made of high-temperature-super-conduction (HTSC) material, so that when said HTSC material of said filter is subject to a sudden infusion or invasion of said electromagnetic pulses, it is switched to a high impedance state in a very short period of time in effectively restricting currents passing through said filter, hereby avoiding the damages of a communication system.

17 Claims, 7 Drawing Sheets

ELECTROMAGNETIC PULSE PROTECTION CIRCUIT HAVING WAVE FILTERING CAPABILITY

BACKGROUND OF THE INVENTION

1. Field of the Invention

The present invention relates to an electromagnetic pulse protection circuit capable of suppressing fast speed and low speed overvoltage spikes caused by electromagnetic pulses (EMP), and in particular to an electromagnetic pulse protection circuit having wave filtering capability.

2. The Prior Arts

In general, since the instantaneous rising speed of high voltage and large current signals are exceedingly fast, so that presently, the so-called lightning protection facilities are disposed in front of electronic communication devices, that belong to a kind of slow response lighting surge protection element (LS protection element), and usually are each composed of a spark-gap-switch or elements made of zinc-oxide. The major characteristic of LS protection element is that, in operation, its response time is rather slow, so that usually when its surge suppression function starts to work, the spike voltage has already been exceedingly high. As such, it does not provide timely and sufficient protection against fast rising voltage pulses.

Though, behind an ordinary IC circuit, a fast Electrostatic Discharge (ESD) protection device (ESD protection element, such as TVS, DIAC, or MOV, etc.) is provided for protection, and the response of this fast speed response protection element is rather fast, and it withstands a voltage of up to 8000V, however, it is not a very good current enduring element. In particular, the width of a pulse generated by lightning or man-made electromagnetic pulse bomb is rather wide, such that, long period of overvoltage will produce an excessive current effect in generating excessive heat. As such, the heat thus generated will first burn out an electrostatic discharge (ESD) protection device (fast response protection element), and then it will burn out the internal structure of semiconductor. Therefore, this kind of fast response protection element is only capable of withstanding electrostatic discharge, and it is not able to withstand various EMP attacks of high energies.

In general, communication equipments are provided with lightning protection device (namely, LS protection element), thus behind an IC circuit an electrostatic discharge (ESD) protection device (ESD protection element) is disposed for protection. However, even if an LS protection element and a fast response protection element are connected in parallel, yet this kind of arrangement is not effectively solve the problem mentioned above. Therefore, current will first flow to a fast response protection element of fast conduction, since current endurance capability of the fast response protection element is very much limited, thus it will be burned out quickly, thus the voltage will rise again. So the chances are, the IC circuit device disposed behind this arrangement has already been burned out before the LS protection element is activated to function. In addition, since a fast response protection element is a kind of capacitative element, the application of it will incur insertion loss to signals input to a communication equipment, hereby adversely affecting communication distance of the signals.

In order to solve the above-mentioned problem, the inventor of the present invention proposes a method of solution as disclosed in Patent Publication Number 588888 of Taiwan, ROC. Referring to FIG. 1, for a circuit diagram of a spike suppression circuit in an electromagnetic pulse protection circuit according to the prior art. Wherein, an electromagnetic pulse protection circuit is realized through connecting a fast response protection element 43 with an LS protection element 41 by means of a resistance element 42, and a compensation element 44 is series connected to the fast response protection element 43 from below. Since usually, fast response protection element 43 is of a capacitative type, therefore, it has the following disadvantages: while in middle frequency range, inferior fast spike discharge will occur due to the existence of inductance; yet in higher frequency range, bandstop effect will occur, and that is detrimental to frequency jumping applications for wide frequency band. For this reason, the inventor of the present invention subsequently discloses a new kind of electromagnetic pulse protection circuit, wherein, compensation is made further for an insertion loss caused by a fast response protection element 43, or otherwise, its structure is changed, as shown in FIG. 2. As such, this kind of arrangement is not only suppress an ordinary lightning strike, but it also prevents various kinds of fast EMP attacks, moreover, insertion loss is compensated; therefore, it is utilized in higher frequency range for withstanding and suppressing spikes of higher energies.

However, in order to achieve better protection against electromagnetic pulses, in the previous cases of prior art mentioned above, the impedance characteristics of impedance elements are utilized, yet the requirements of effectively suppressing electromagnetic pulses of various frequencies have not been fully met, thus it still has much room for improvements.

SUMMARY OF THE INVENTION

Due to the problems and drawbacks of the prior art, a major objective of the present invention is to provide an electromagnetic pulse protection circuit having wave filtering capability, that is used to effectively suppress electromagnetic pulses of a specific frequency by utilizing an impedance incurring frequency provided by a filter on signal transmission routes, thus raising the electromagnetic-pulse-resistive capability of electronic elements and system reliability.

The electromagnetic pulse protection circuit having wave filtering capability of the present invention is realized by an inductor free LS protection circuit and an inductor free fast response protection circuit as linked and combined by a filter. In the above-mentioned structure, the fast response protection circuit is realized by inductor free series-connecting ESD elements, so as to reduce the insertion loss, or it is made by series-connecting inductive compensation elements, so that ESD elements is ignored or neglected at higher frequency, hereby forming a high-pass circuit. Or, alternatively, the electromagnetic pulses protection circuit of the present invention further is series-connected a capacitative-impedance element, and that is essentially a voltage dependent capacitor, and its capacitance is varied depending on magnitude of an input voltage. In normal operations, the capacitance of a voltage dependent capacitor is high, while its impedance is low; yet, when strong overvoltage electromagnetic pulses occur, the capacitance of the variable capacitor is low, while the impedance will increase, as such pulse signals do not pass through the voltage dependent capacitor, therefore, it is capable of preventing spikes from damaging electronic elements.

Moreover, in the present invention, high-temperature-super-conduction (HTSC) characteristics are utilized in designing electromagnetic pulse protection circuits, such that filter is made of HTSC materials. The essence of the design principle utilized is that, when a device made of HTSC material is subject to a sudden infusion of electromagnetic pulses, a current surpassing critical current (Jc) will pass through the HTSC material, and instantaneously, the HTSC material will be converted from a super-conduction (SC) state into a normal (NM) state, such that its electrical resistance will increase instantaneously to a very high value, as such restricting the current passing through the HTSC material. In addition, in the present invention, other protection elements are used to form bypassing circuits, with their impedances much lower than those of normal (NM) state, thus they are used to bypass huge amount of pulse current. Therefore, when electromagnetic pulses disappear, then the HTSC material will return to its super-conduction (SC) state, and then the system will resume its normal operations. In general, the time of conversion from a SC state to an NM state is less than a few micro seconds, or it reaches nano second range. Therefore, HTSC materials have a very good prospect of being utilized in producing fast electromagnetic pulse (EMP) protection circuit operating in nano-second range. The application of HTSC material (with its critical temperature higher than the liquid helium critical temperature of 77 K) may simplify the requirements of cooling the system, so as to make it possible and feasible to utilize HTSC materials in the protection against electromagnetic pulses.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention is appreciated and understood more thoroughly through the following detailed description with reference to the attached drawings.

Figure 1:
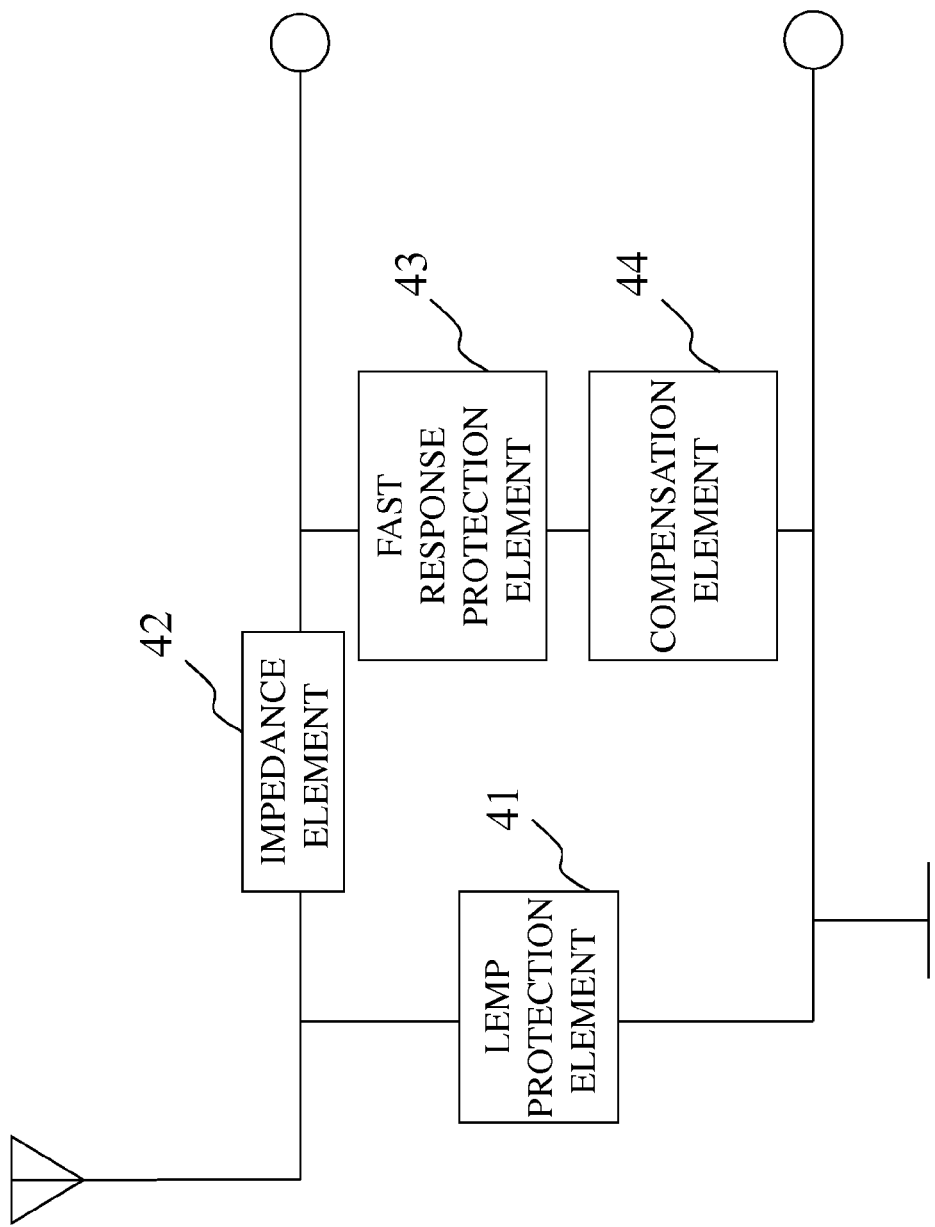
FIG. 1 is a circuit diagram of a spike suppression circuit in protection circuit of the prior art.
Figure 2:
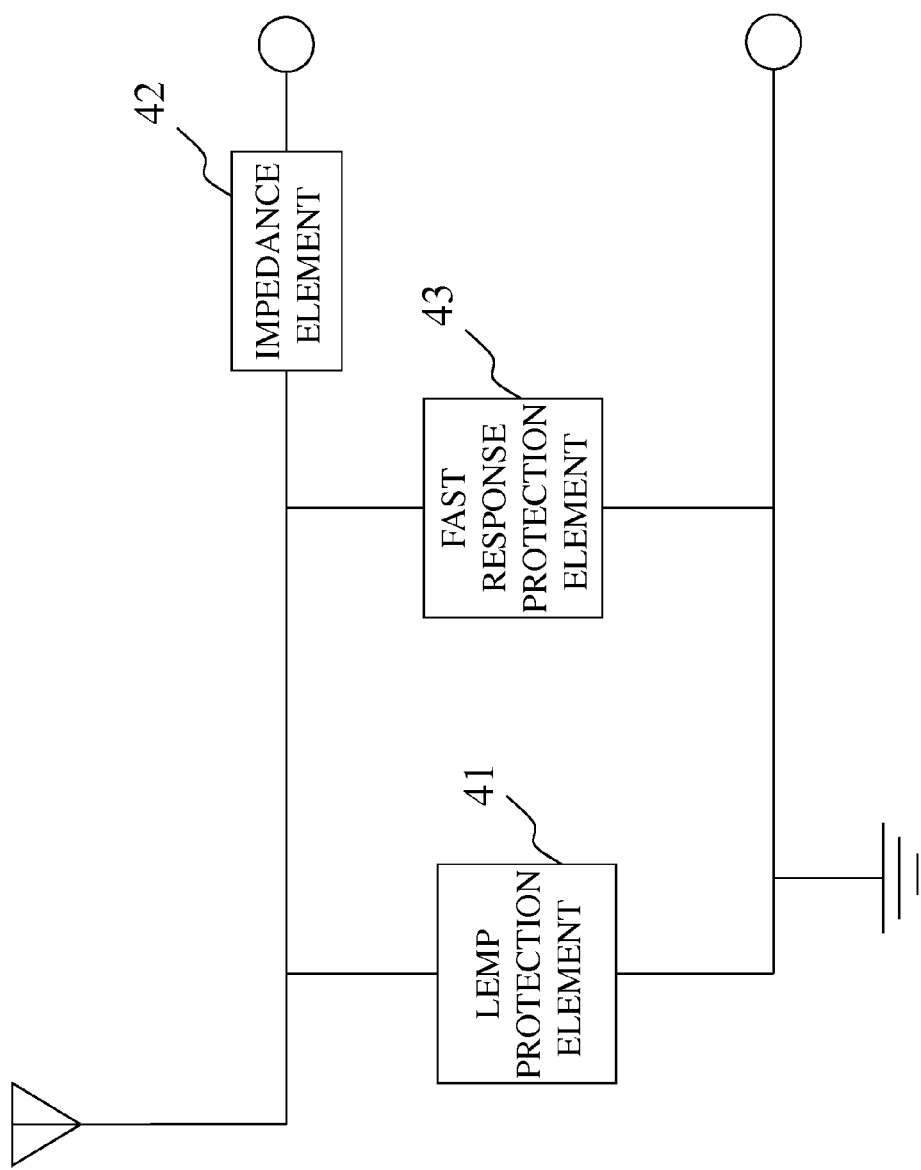
FIG. 2 is a circuit diagram of another spike suppression circuit in pulse protection circuit of the prior art.
Figure 3:
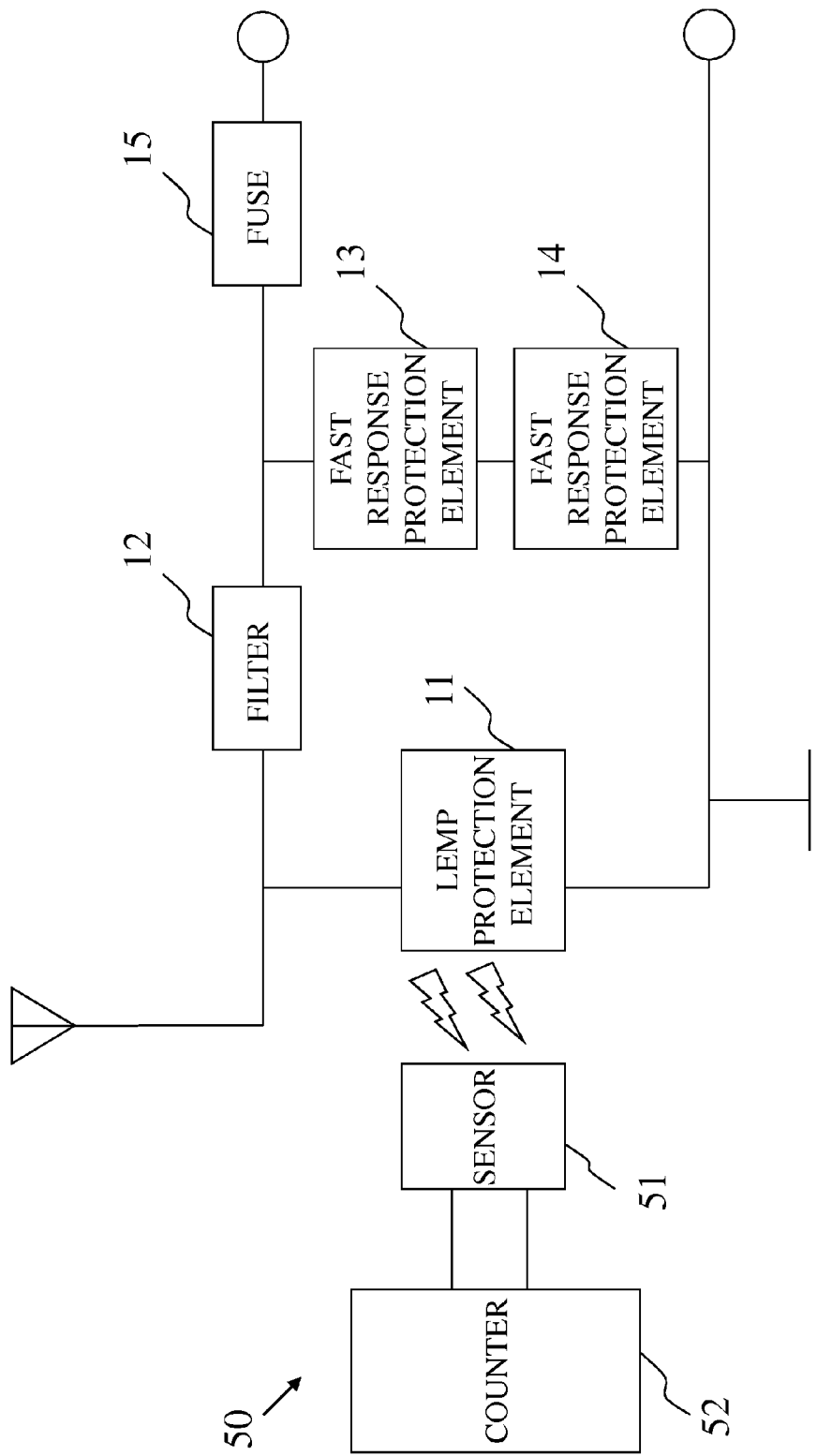
FIGS. 3 & 4 are a circuit diagram of a spike suppression circuit & a schematic diagram showing the effectiveness of spike suppression respectively according to a first embodiment of the present invention.

Firstly, referring to FIG. 3 for a circuit diagram of a spike suppression circuit according to a first embodiment of the present invention. As shown in FIG. 3, an inductor free fast response protection element 13 and an inductor free LS protection element 11 are linked and combined together via a filter 12. This filter 12 provides sufficient impedance for suppressing electromagnetic pulses at a specific frequency, thus raising protection effectiveness against electromagnetic pulses. In the present embodiment, another fast response protection element 14 is added below the fast response protection element 13 in the circuit to serve as a compensator for immediate frequency. Since the resultant capacitance of the series-connecting fast response protection elements 13 and 14 tends to be lower than the capacitance of either of the elements, thus the insertion loss is reduced; furthermore, a stage of fuse 15 is added thereafter, for preventing the occurrences of being stricken by electric shocks, when its antenna accidentally touches exposed power wires during installation.

Figure 4:
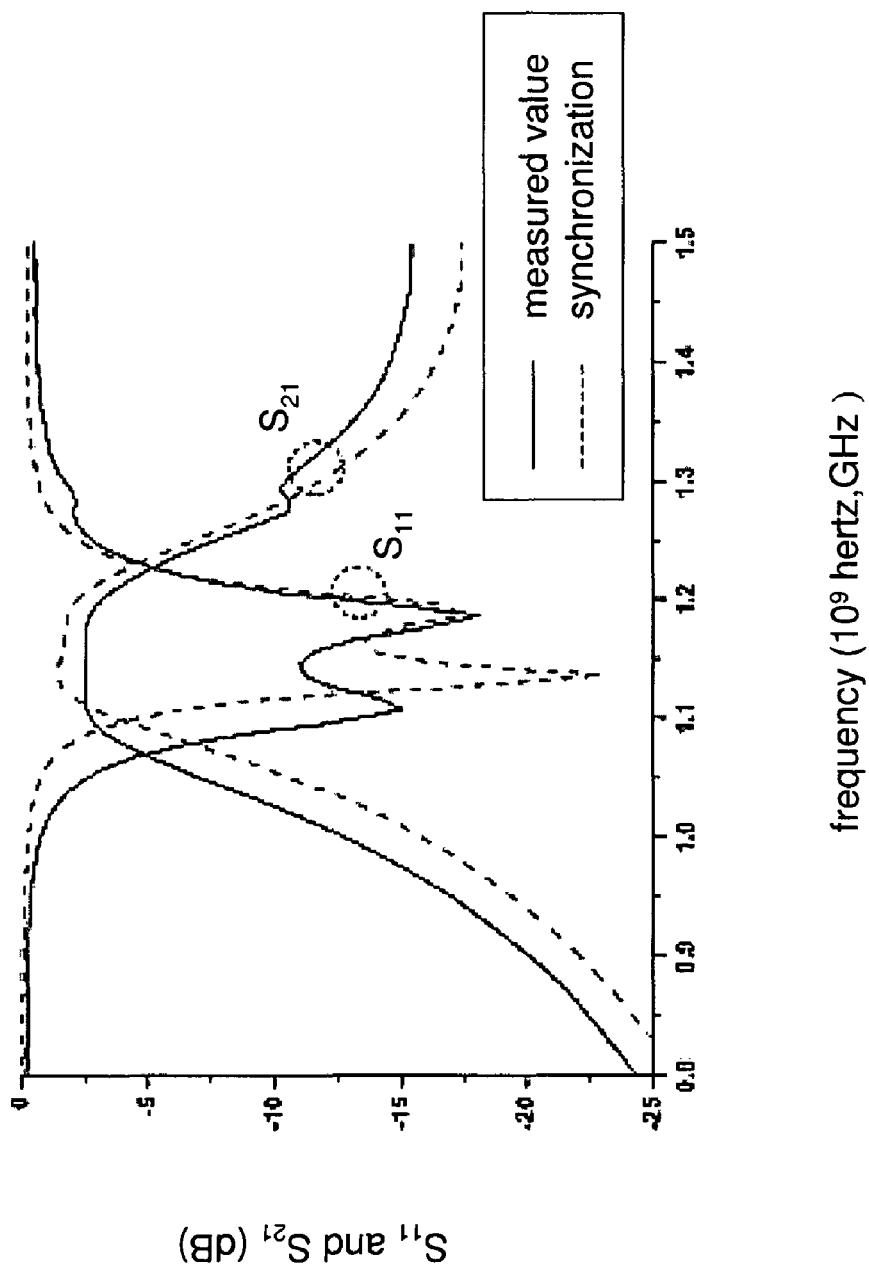

In the above-mentioned structure, the filter 12 utilized is a kind of band-pass filter, and that is used to block the passage of or effectively suppress the electromagnetic signals received for some specific frequencies. Referring to FIG. 4 for a schematic diagram showing the effectiveness of spike suppression by filter 12 according to a first embodiment of the present invention. As shown in FIG. 4, it shows the suppression effects of filter 12 for electromagnetic pulse at various different frequencies, wherein, curve $S_{11}$ indicates reflectivity of electromagnetic waves, while curve $S_{21}$ indicates transmittance of electromagnetic waves. In an electromagnetic wave frequency range of higher reflectivity of curve $S_{11}$ and lower transmittance of curve $S_{21}$, a filter 12 is designed to have better electromagnetic wave blocking or suppressing effectiveness. Usually, filter 12 is specifically designed to function and operate in an electromagnetic wave frequency range desired to be blocked or suppressed. In general, its reflectivity is preferably to be more than 15 dB (decibel), while its transmittance is preferably to be less than 3 dB. Usually, a filter is composed of resistors and capacitors. Presently, the filter in suppressing electromagnetic pulses mentioned above is Micro Strip Filter and Micro Slot Filter, with its shape for example, but not limited to, a round shape or a square shape.

More specifically, the kind of filter mentioned above is made of HTSC material. Such an HTSC material, due to its ceramic property, is especially suitable for making thin films, and that is precisely fit for producing micro strip lines used in high frequency transmission. The micro strip line structure is formed as a thin film micro-strip line of adequate width on an insulated substrate having its back side studded with conductive films, such that it is produced through utilizing an ordinary photolithographic process, and is in compatible with a semiconductor manufacturing process. In case that HTSC thin film is made into microstrip line, such that it is integrated into and function efficiently in cooperation with an electromagnetic micro wave circuit of an antenna system, then the endurance/resistance of the system against the electromagnetic pulses is significantly raised.

Therefore, high-temperature-super-conduction (HTSC) characteristic is utilized in designing and producing electromagnetic pulse protection element for use in high speed microwave frequency section. The main reason that the HTSC material is utilized in design for suppressing spikes is that: when a device made of HTSC material is suddenly subject to infusion of electromagnetic spikes, a current surpassing critical current (Jc) will pass through the HTSC material, and then instantaneously, the HTSC material will be transformed from a super-conduction (SC) state into a normal (NM) state, and this process is called a Quench Process. In situation like this, the instantaneous increase of electrical resistance will greatly attenuate the signals passing through in good number of decibels, hereby effectively restricting the current passing through the HTSC material of the device. The transition from a Sc state to an NM state is measured in less than a few micro seconds, or it even reaches nano second range. As such, the HTSC material is utilized to protect circuits in suppressing fast electromagnetic pulses in a nanosecond range.

In addition, in the present embodiment, a counter circuit 50 is placed in a sensing position near LS protection element 11. The counter circuit 50 includes a sensor 51 and a counter 52. The sensor 51 just mentioned is a photo sensor or a magnetic sensor, and that is used to sense and measure the variations of light emitted or magnetic force generated by the LS protection element 11, and then output counting signals. Subsequently, counter 52 will receive the counting signals in calculating and obtaining the action number of LS protection element 11. In this manner, counter 52 is used to inform operator of the device in advance whether LS protection element 11 has reached its service duration and needs to replace its related elements through the data or text displayed or the sound generated by the counter.

Figure 5:
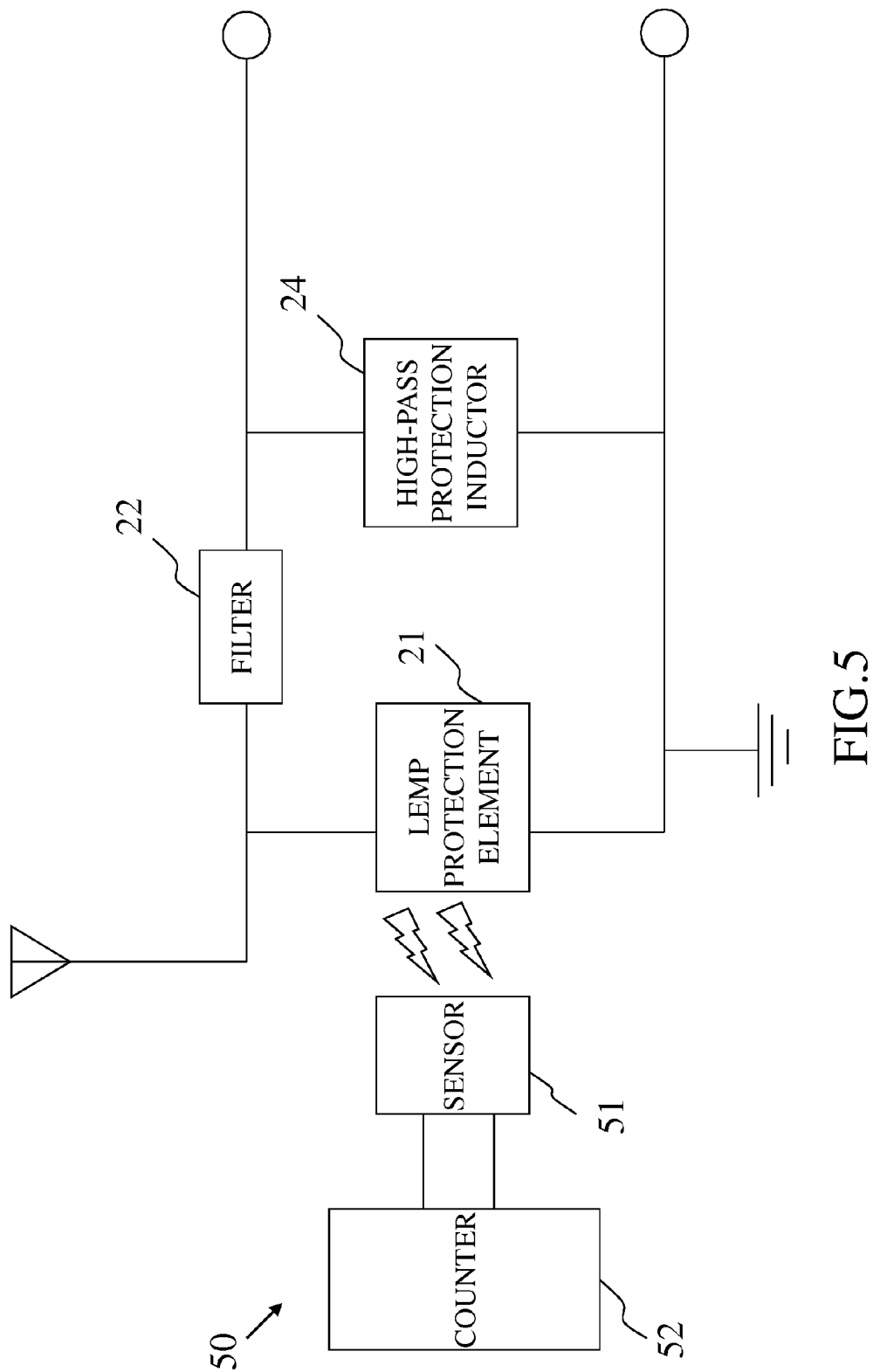
FIGS. 5 & 6 are circuit diagrams of spike suppression circuits having their filters at different positions respectively according to a second embodiment of the present invention.
Figure 6:
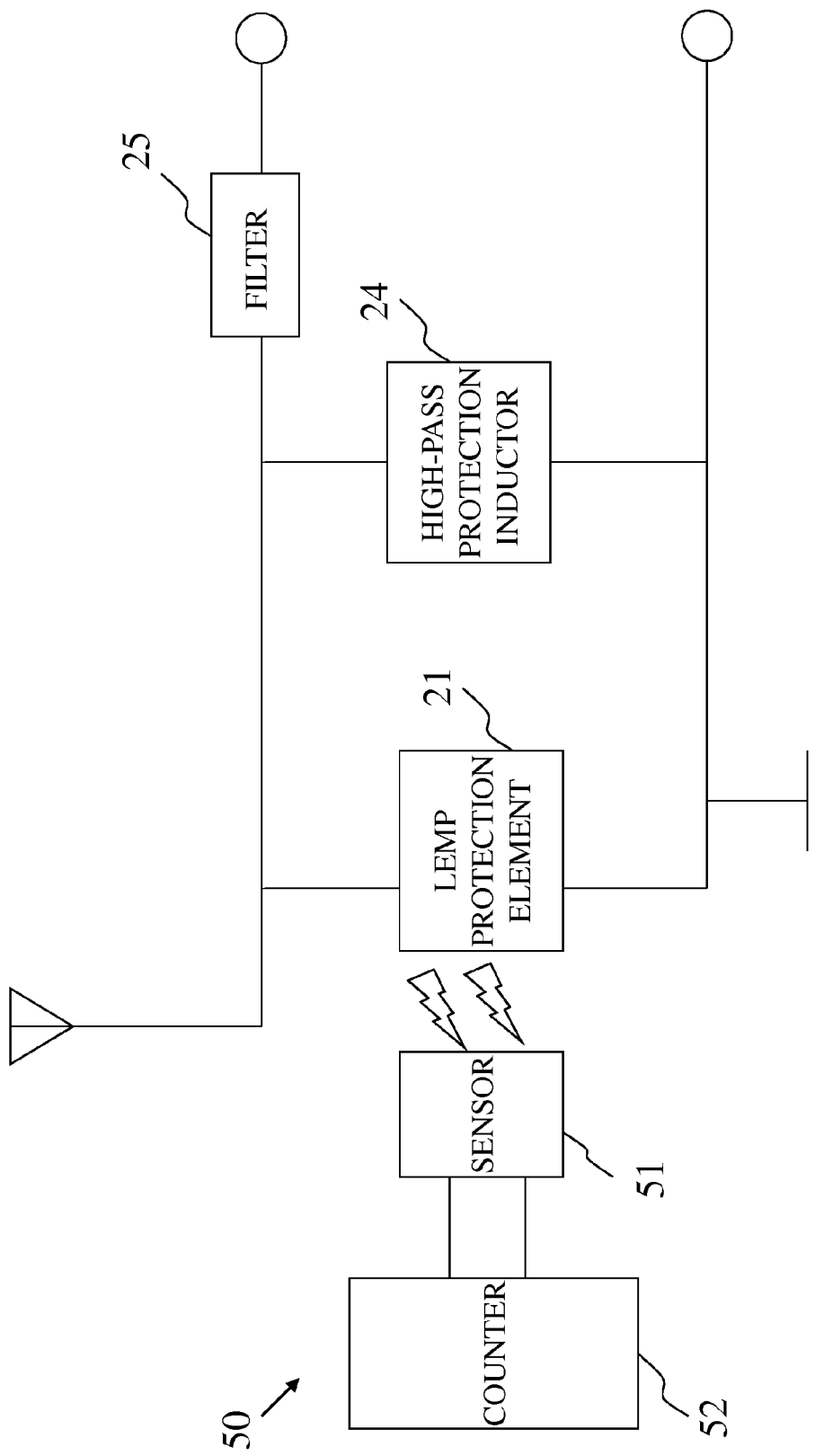

Subsequently, referring to FIG. 5 for an electromagnetic pulse protection circuit having wave filtering function according to a second embodiment of the present invention. As shown in FIG. 5, the electromagnetic pulse protection circuit of the present invention is realized by a high-pass protection inductor 24 and an LS protection element 21, as connected and combined by a filter 22. In the present embodiment, a high-pass protection inductor 24 having inductance less than 10 nF is utilized. Since the frequency spectrum of NEMP and LS protection elements are both under 300 MHz, such that communication equipment of high frequency may directly utilize inductor of small inductance for preventing insertion loss on one hand, and for releasing and discharging the invading spikes to ground on the other hand; and in this case, the filter is placed at the rear portion of the electromagnetic pulse protection circuit, as shown as filter 25 in FIG. 6, or, alternatively, the filter is disposed on both sides of a high-pass protection inductor 24. As such, when electromagnetic spikes invading and coming in, the voltage $V_L = L \times dI/dt$ thus produced by the inductance impedance is used to activate an LS slow response protection element in the front portion of the electromagnetic pulse protection circuit for implementing the protection function; also, filter 25 is used to protect the succeeding stages of the electromagnetic pulse protection circuit.

Figure 7:
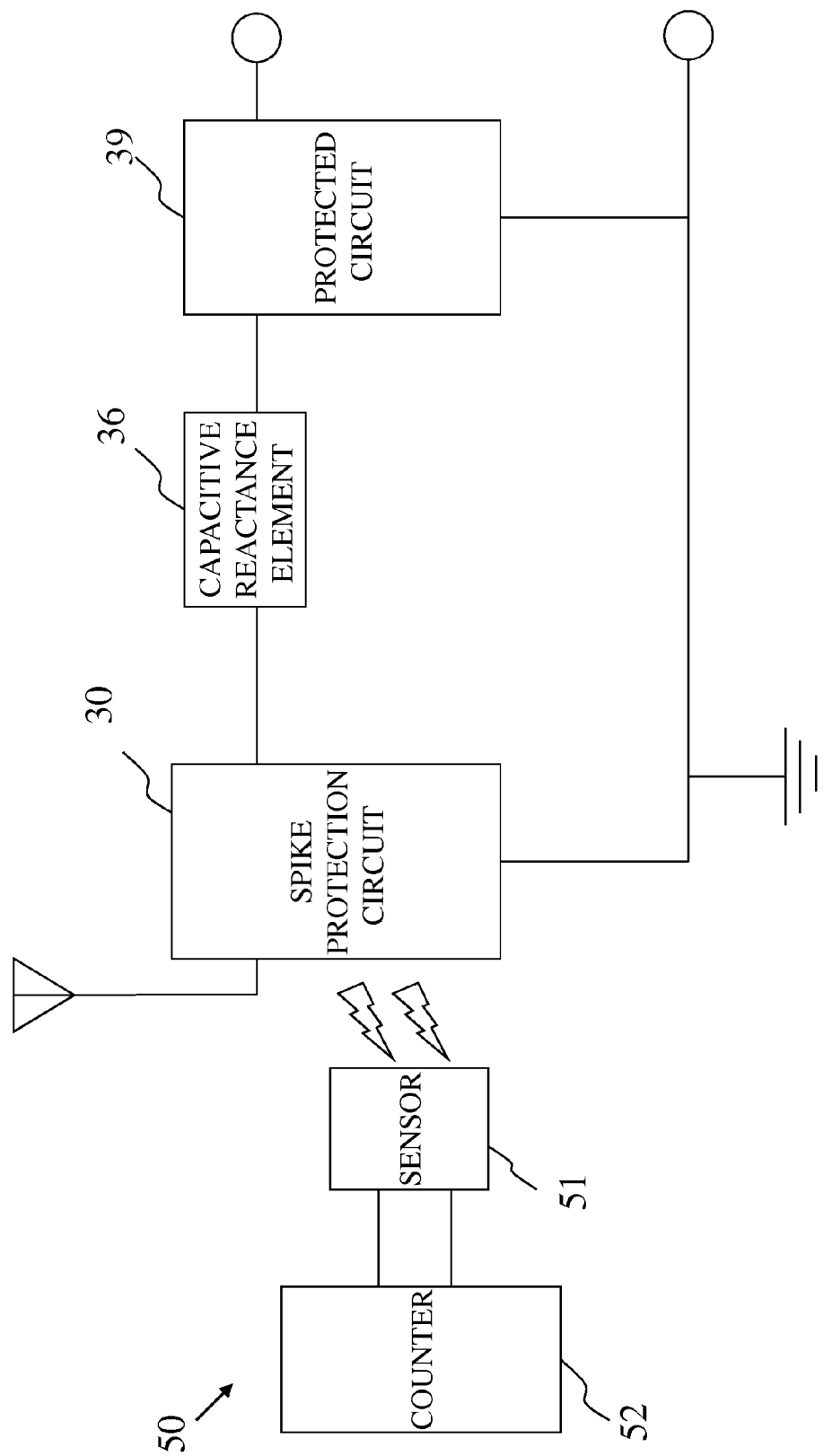
FIG. 7 is a circuit diagram of a spike suppression circuit according to a third embodiment of the present invention.

Finally, referring to FIG. 7 for an electromagnetic pulse protection circuit having wave filtering function according to a third embodiment of the present invention. As shown in FIG. 7, the electromagnetic pulse protection circuit of the present invention is realized by series-connecting at least a capacitive reactance element 36 between one of various spike protection circuit 30 composed of an LS protection circuit and a fast response protection circuit, and a protected circuit 39. The capacitive reactance element 36 is a variable capacitor, with its capacitance variable according to an input voltage. In normal operations, the capacitance of this variable capacitor is high, and its impedance is low, so that signals may pass through the variable capacitor normally and reach a communication system; and when exceedingly high voltages occur (such as the incoming EMP), then the capacitance of the variable capacitor will decrease automatically, while its impedance will increase drastically, so that signals do not pass through the variable capacitor, thus preventing the damage of the system. And that is to say, the electromagnetic pulse protection circuit having wave filtering capability of the present invention will first activate spike protection circuit 30 in a fast manner, and coupled with the blockage caused by impedance of the capacitive reactance element 36, hereby ensuring that the communication system will not be damaged or adversely affected by the incoming electromagnetic spikes. The afore-mentioned variable capacitor is of the following structures: metal/semiconductor/metal (MSM) structure or metal/insulator layer/semiconductor/insulator layer/metal (MISIM) structure.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. An electromagnetic pulse protection circuit having wave filtering function, comprising:
    at least one stage of inductor free slow response protection circuit, and at least one stage of inductor free fast response protection circuit, and said two circuits are linked and combined by a filter in between, wherein the filter provides impedance for suppressing electromagnetic pulses at a predefined frequency; and
    at least a capacitive reactance element, linked and combined between said inductor free slow response protection circuit and said inductor free fast response protection circuit, and a protected circuit.

2. The electromagnetic pulse protection circuit having wave filtering function of claim 1, wherein said filter includes a micro strip filter or a micro slot filter.

3. The electromagnetic pulse protection circuit having wave filtering function of claim 1, wherein
    said filter is made of high temperature superconductor (HTSC) material.

4. The electromagnetic pulse protection circuit having wave filtering function of claim 1, wherein
    said capacitive reactance element includes a voltage dependent capacitor.

5. The electromagnetic pulse protection circuit having wave filtering function of claim 1, wherein
    said voltage dependent capacitor is made of the following structures: metal/semiconductor/metal (MSM) structure or metal/insulator layer/semiconductor/insulator layer/metal (MISIM) structure.

6. The electromagnetic pulse protection circuit having wave filtering function of claim 1, further comprising:
    a counter circuit, placed in a sensing position of said inductor free slow response protection circuit, said counter circuit includes a sensor and a counter, and said sensor is used to sense said inductor free slow response protection circuit, and then output counting signals, said counter will receive the counting signals.

7. The electromagnetic pulse protection circuit having wave filtering function of claim 6, wherein
    said sensor is a photo sensor or a magnetic sensor, and that is used to sense variations of lights emitted or magnetic forces generated by said inductor free slow response protection circuit.

8. The electromagnetic pulse protection circuit having wave filtering function of claim 1, wherein
    a fuse is linked and combined to and behind said inductor free fast response protection circuit and said filter.

9. The electromagnetic pulse protection circuit having wave filtering function of claim 1, wherein
    said inductor free fast response protection circuit includes a plurality of series-connected ESD (Electrostatic Discharge) elements.

10. An electromagnetic pulse protection circuit having wave filtering function, comprising:
- at least one stage of inductor free slow response protection circuit, and at least one stage of inductor free fast response protection circuit, and a filter is series-connected to and behind said two circuits, where in the filter provides impedance for suppressing electromagnetic pulses at a predefined frequency; and
- at least a capacitive reactance element, linked and combined between said inductor free slow response protection circuit and said inductor free fast response protection circuit, and a protected circuit.

11. The electromagnetic pulse protection circuit having wave filtering function as claimed in claim 10, wherein
said filter includes a micro strip filter or a micro slot filter.

12. The electromagnetic pulse protection circuit having wave filtering function of claim 10, wherein
said filter is made of high temperature superconductor (HTSC) material.

13. The electromagnetic pulse protection circuit having wave filtering function of claim 10, wherein
said capacitive reactance element includes a voltage dependent capacitor.

14. The electromagnetic pulse protection circuit having wave filtering function of claim 13, wherein
said voltage dependent capacitor is made of the following structures: metal/semiconductor/metal (MSM) structure or metal/insulator layer/semiconductor/insulator layer/metal (MISIM) structure.

15. The electromagnetic pulse protection circuit having wave filtering function of claim 10, further comprising:
a counter circuit, placed in a sensing position of said inductor free slow response protection circuit, said counter circuit includes a sensor and a counter, and said sensor is used to sense said inductor free slow response protection circuit, and then output counting signals, said counter will receive the counting signals.

16. The electromagnetic pulse protection circuit having wave filtering function of claim 15, wherein
said sensor is a photo sensor or a magnetic sensor, and that is used to sense variations of lights emitted or magnetic forces generated by said inductor free slow response protection circuit.

17. The electromagnetic pulse protection circuit having wave filtering function of claim 10, wherein
said inductor free fast response protection circuit includes a plurality of series-connected ESD elements.

* * * * *